United States Patent [19]

Bruder

[11] Patent Number: 4,972,192
[45] Date of Patent: Nov. 20, 1990

[54] CONSTANT AMPLITUDE DOPPLER PRODUCING RADAR REFLECTOR

[75] Inventor: Joesph A. Bruder, Dunwoody, Ga.

[73] Assignee: Georgia Tech Research Corporation, Atlanta, Ga.

[21] Appl. No.: 431,939

[22] Filed: Nov. 6, 1989

[51] Int. Cl.$^5$ .............................................. G01S 13/58
[52] U.S. Cl. ........................................ 342/6; 342/171
[58] Field of Search ...................................... 342/5–7, 342/165, 169, 171

[56] References Cited

U.S. PATENT DOCUMENTS

| | | | |
|---|---|---|---|
| 2,472,212 | 6/1949 | Hudspeth | 342/ |
| 2,917,739 | 12/1959 | Halpern | 342/ |
| 3,882,503 | 5/1975 | Gamara | 342/ |
| 4,370,654 | 1/1983 | Krutsch | 342/ |
| 4,517,569 | 5/1985 | Gerharz | 342/ |

Primary Examiner—Thomas H. Tarcza
Assistant Examiner—Mark Hellner
Attorney, Agent, or Firm—Hurt, Richardson, Garner, Todd & Cadenhead

[57] ABSTRACT

A constant amplitude Doppler producing radar reflector for simulating a moving target. A plurality of dihedral reflectors having equal radar cross sections are rotated axially at equal rotational speeds. The dihedral reflectors are separated laterally and in the direction towards the illuminating radar by a distance which keeps the radar returns from the two reflectors in phase quadrature. With the radar cross sections of the reflectors being equal, the return signals to a linearly polarized radar maintains constant amplitude as the dihedral reflectors rotate.

18 Claims, 5 Drawing Sheets

FIG. 1a  FIG. 1c

Section A-A

Section A-A

Section A-A

Section A-A

CONSTANT AMPLITUDE DOPPLER PRODUCING RADAR REFLECTOR

BACKGROUND OF THE INVENTION

This invention relates generally to radar systems, and more particularly to a calibrated moving target simulator of constant amplitude and precisely controllable Doppler.

The device of this invention is a calibrated test target for checking the performance of moving target indication (MTI) radars. It comprises a rotating dihedral reflector (quadrahedral) to simulate the return from a moving target with a constant radar cross-section (RCS). A number of methods exist in the prior art for simulating moving targets. One method is the injection of simulated target signals directly into the radar receiver. This method is commonly used to test MTI radars but does not include the effects of transmitter instabilities or scanning losses. In a second method, a microwave antenna is terminated by a waveguide short with a pin diode situated a distance in front of the waveguide short. The pin diode is modulated by alternately turning the pin diode on and off thus producing a discrete phase shift in the signal reflected back to the radar. The return signal provides a return at the simulated speed plus multiples of the simulated speed due to square wave modulation and, as such, cannot be used to determine signal loss at blind speeds. The return signal is also difficult to calibrate due to antenna voltage standing wave ratio and pin diode variables.

In a third method, a microwave signal is received in one antenna, modulated with a low frequency signal corresponding to the simulated target speed, amplified and retransmitted to a second antenna. The amplitude of the return is hard to calibrate due to the variability of all components in the system including antenna voltage standing wave ratios, amplifier gain and mixer conversion losses. The unwanted signal sideband is hard to eliminate due to the relatively low Doppler frequencies of the simulated target.

A fourth method involves the rotation of a trihedral or other reflector on an arm to induce motion of the reflector with respect to the radar. This method results in amplitude modulation and variation at the apparent target Doppler. An example is U.S. Pat. No. 4,370,654.

A fifth method involves modulation of one of the reflecting walls of a trihedral or other reflector by electrical or mechanical means. This method primarily produces amplitude modulation. Examples are U.S. Pat. Nos. 3,417,398; 3,308,464; and 2,917,739. Other prior art references include: A U.S. Army Electronics Command Technical Report entitled "An L-Band Moving Target Simulator" by John L. Kerr, November 1970. This report describes the development of an L-band moving target simulator which provides the Doppler frequencies required to simulate target radial speeds in the range of one-half miles per hour to thirty miles per hour. The design provides single sideband performance and generates the Doppler frequencies with reasonable rotational speeds.

However, none of the prior art methods contain the three most important attributes needed for a moving target simulator. These attributes are a precisely calibrated radar cross-section, a constant radar cross-section, and a precisely controllable Doppler frequency.

SUMMARY OF THE INVENTION

It is therefore an object of this invention to provide a calibrated MTI target which will appear to a linearly polarized radar as a target of constant radar cross-section (RCS) moving either towards or away from the radar at a constant velocity.

It is another object of this invention to provide a calibrated test target which can be used to perform MTI test measurements.

It is a further object of this invention to provide a moving target simulator having a precisely calibrated radar cross section, a constant radar cross section, and a precisely controllable single-sided Doppler frequency.

It is a still further object of this invention to provide a single axis device that can be used as an electronic countermeasures device. The complex reflector could be produced economically in quantity by precision casting or electroforming. The expendable device could then be used to deceive threat radars by simulating the return from a moving target.

These and other objects are achieved by a device comprised of two dihedral reflectors of equal radar cross-section which are rotated on axis at equal rotational speeds. The dihedral reflectors are separated laterally so that each has a clear view of the radar. The seam alignment of the second reflector is preferably displaced 45 degrees in angle from that of the first reflector. The reflectors are separated in a direction towards the radar preferably by a distance equivalent to the radar frequency wave length ($\lambda$) divided by 8. The device can use any even bounce reflectors such as top hat reflectors or segmented cylindrical reflectors. The latter is the subject of my copending patent application Ser. No. 290,029.

BRIEF DESCRIPTION OF THE DRAWINGS

FIG. 3(b) is a side elevational view of the embodiment of FIG. 3(a) taken parallel to the crease of dihedral a;

FIG. 3(c) is side elevational view of the embodiment of FIG. 3(a) taken at an angle 90 degrees to the crease of dihedral a;

DETAILED DESCRIPTION OF THE INVENTION

Figure 1A:
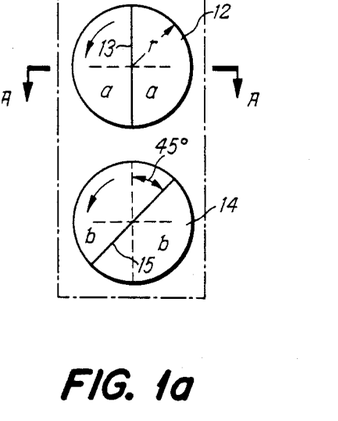
FIG. 1(a) is a top plan view of the preferred embodiment of the MTI moving target simulator of this invention.
Figure 1B:
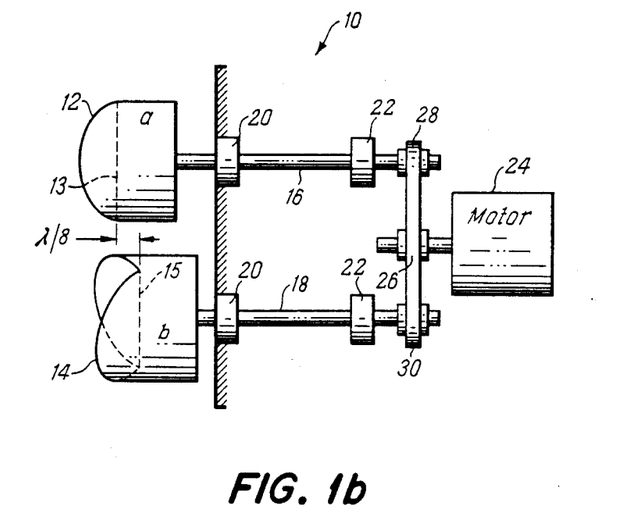
FIG. 1(b) is a side elevational view of the preferred embodiment of the MTI moving target simulator of this invention.
Figure 1C:
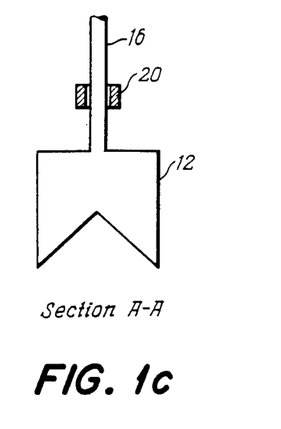
FIG. 1(c) is a sectional view of one of the dihedral reflectors taken along section lines A—A of FIG. 1(a)
Figure 2A:
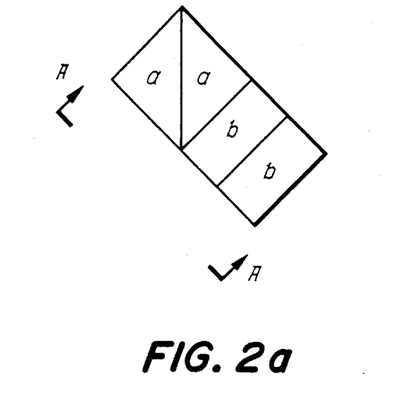
FIG. 2(a) is a top plan view of an alternate embodiment of my present invention wherein two dihedral reflectors are rotated about a common axis of rotation.
Figure 2B:
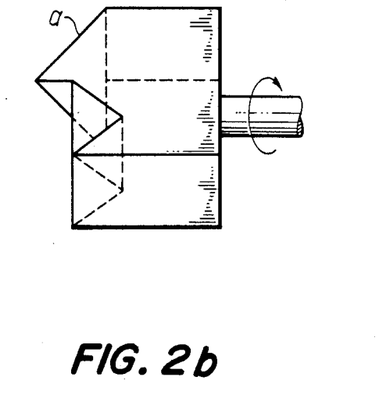
FIG. 2(b) is a side elevational view taken at an angle 90 degrees to the crease of dihedral a shown in FIG. 2(a)
Figure 2C:
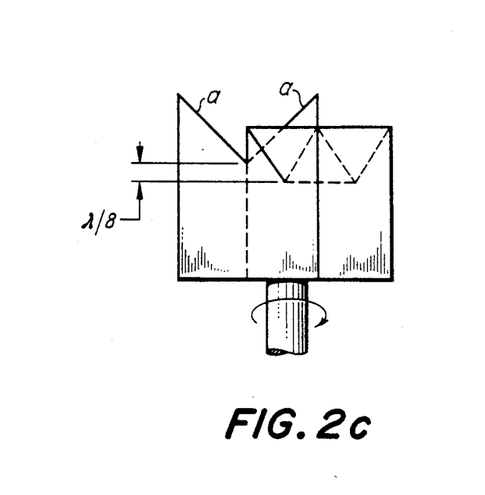
FIG. 2(c) is side elevational view taken parallel to the crease of dihedral a of FIG. 2(a)
Figure 2D:
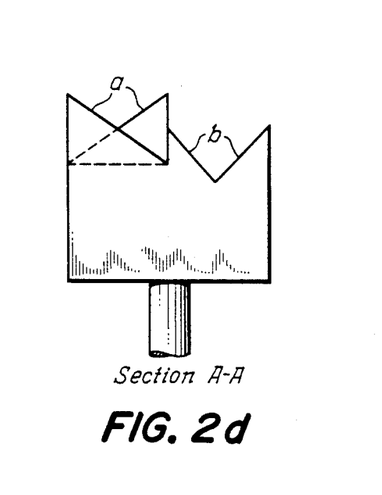
FIG. 2(d) is a side elevational view taken along section A—A of FIG. 2(a)
Figure 3A:
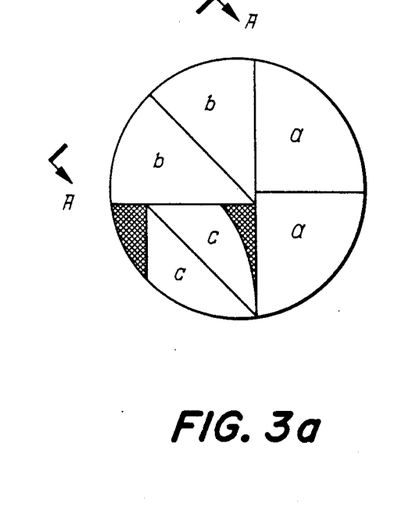
FIG. 3(a) is a top view of a further alternate embodiment of the MTI moving target simulator of this invention illustrating three dihedral reflectors rotated about a common axis of rotation.
Figure 3B:
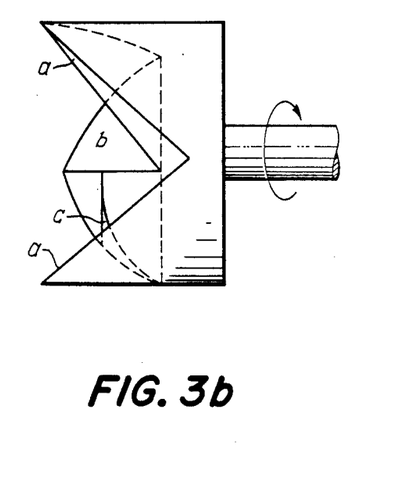
Figure 3C:
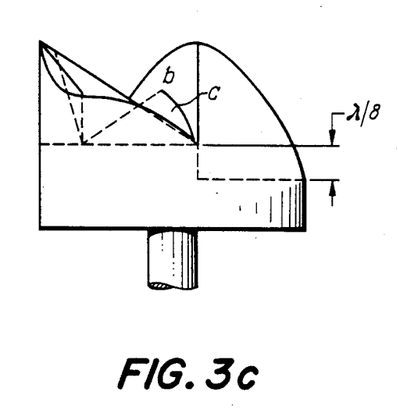
Figure 3D:
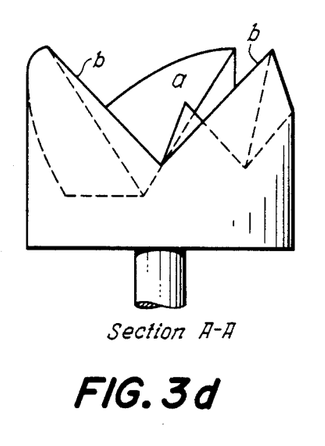
FIG. 3(d) is a side elevational view of the embodiment of FIG. 3(a) taken along section line A—A.
Figure 4A:
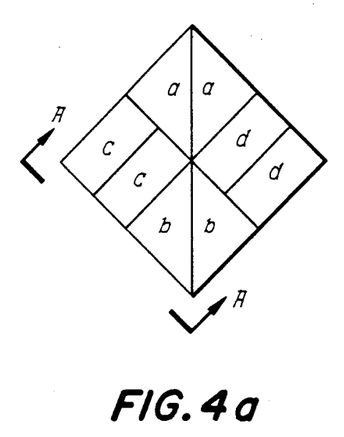
FIG. 4(a) is a top plan view of a further embodiment the MTI moving target simulator of this invention illustrating four dihedral reflectors rotated about a common axis of rotation.
Figure 4B:
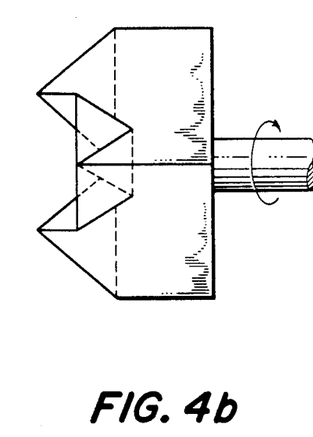
FIG. 4(b) is a side elevational view of the embodiment of FIG. 4(a) taken at an angle 90 degrees to the creases of dihedrals a and b therein.
Figure 4C:
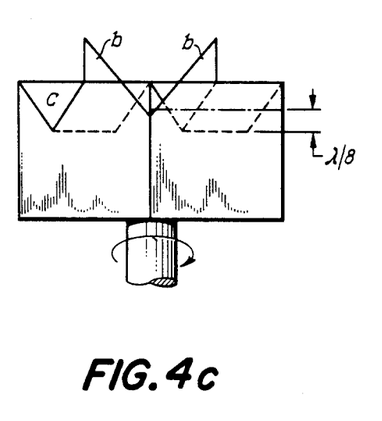
FIG. 4(c) is a side elevational view of the embodiment of FIG. 4(a) taken at an angle parallel to the creases of dihedrals a and b therein.
Figure 4D:
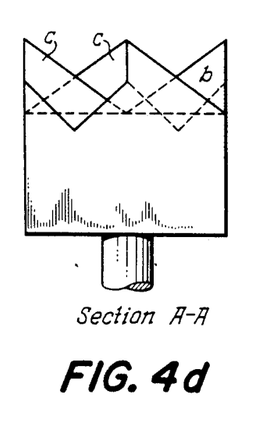
FIG. 4(d) is a side elevational view taken along section line A—A of FIG. 4(a)

Referring to FIGS. 1(a), (b), and (c), there is shown a device 10 comprised of two dihedral reflectors 12, 14 mounted on shafts 16, 18 and supported by high speed precision bearings 20, 22. The dihedral reflectors 12, 14 are rotated on axis at equal rotational speeds by a $\frac{3}{4}$ horsepower variable speed motor 24 through drive gear 26 and spur gears 28, 30. The device 10 is also referred to as a quadrahedral. The motor can be powered by a portable 4 kW generator. The reflectors 12, 14 are separated laterally and in the direction towards the radar by a distance equal to $\lambda/8$. In this manner, the radar returns from the two reflectors are in phase quadrature, that is, they are separated in phase by 90°.

The dihedrals, 12, 14 are set up so that the crease 13 of the first reflector 12 becomes vertical at 45° of rotation prior to when the crease 15 of the second reflector 14 becomes vertical. When the amplitude returns from the first reflector 12 are maximum, the returns from the second reflector 14 are zero. As the reflectors start to rotate, the returns from the first reflector 12 start to decrease and returns from the second reflector 14 start to increase. Since the returns from the two reflectors are in phase quadrature, the amplitude of the combined return signals are given by the square root of the sum of the squares of the individual return signal amplitudes from the two reflectors. A key to this invention is that if the radar cross-section of the two reflectors are equal then the return signals to a linearly polarized radar maintain constant amplitude as the dihedrals rotate.

The phase of the combined radar returns will initially be determined by the first reflector 12, but as the reflectors start to rotate, the phase of the return signals is a combination of the phase of the two reflectors. Since the phase of the second reflector 14 is in phase quadrature with that of the first reflector 12, and because of the 45° lag in the rotation of the second reflector 14, the phase of the RF signal increases linearly (or decreases linearly depending upon the rotational direction) at a rate of 360° for each 180° of revolution of the dihedral reflectors. Therefore, the rotating reflectors 12, 14 produce a Doppler frequency that is twice the rotational frequency of the reflectors. The rotational speed of the dihedral reflectors 12, 14 can then be related to the simulated target velocity in the radial direction towards the radar by the equation:

$$RPM = \frac{V_r}{0.06\lambda}$$

where
RPM = the rotational speed of the dihedrals in revolutions per minute,
$V_r$ = the simulated target radial velocity in km/hr,
$\lambda$ = the radar RF wavelength in meters.

Since the radar cross-section of the dihedral reflectors 12, 14 can be determined by known formulas, calibration of the simulated target radar cross-section can easily be achieved. The return signal received back at the radar will have the same properties as that received from a moving target with constant radar cross-section. The radar cross-section $\sigma$ of a vertically-polarized return from a single dihedral with its seam vertical or horizontal, such as dihedral 12 in FIG. 1(a), is given by the equation $$\sigma = \frac{4\pi^3 r^4}{\lambda^2}$$

where r = radius of the dihedral
$\lambda$ = the RF wavelength

FIGS. 2, 3 and 4 show alternate embodiments of this invention. Suitable configurations comprise any combination of two or more even bounce reflectors rotating on axis on the same rotational rate with one or more of the reflectors with creases preferably lags or is displaced 45° with respect to the creases in the remaining reflectors, and with their creases displaced along the axis by a distance of $\lambda/8$ with respect to the creases of the remaining reflectors.

FIG. 2 shows a single rectangular reflector comprised of two dihedrals a, b which are rotated about a common rotary axis. Dihedral b lags dihedral a by 45 degrees and is axially offset behind dihedral a by $\lambda/8$. FIG. 3 shows a single circular array comprised of three dihedrals which are rotated about a common rotary axis. Dihedrals b and c lag dihedral a by 45 degrees, while dihedral a is offset axially behind dihedrals b and c by $\lambda/8$. FIG. 4 shows a single square reflector comprised of four dihedrals which are rotated about a common rotary axis. Dihedrals b and c lag dihedrals a and b by 45 degrees and are axially offset behind dihedrals a and b by $\lambda/8$.

As can be seen from FIGS. 2, 3 and 4, the MTI moving target simulator of the present invention may be comprised of any number of two or more dihedral reflectors which are not necessarily required to be rotated about a single axis as shown by the device of FIG. 1. It is preferable, however, that the radar cross-section (RCS) of the first group of dihedrals whose creases are parallel to each other preferably and substantially equal the radar cross-section of the second group of dihedral reflectors whose creases lag by 45 degrees. Thus, for example, in its preferred embodiment, the radar cross-section of dihedral reflector a of the device is substantially equal to the radar cross-section of dihedral reflector b of FIGS. 1 and 2. The device of FIG. 3 is an effort to maximize the use of a circular area employing three reflectors. In its preferred mode, the radar cross-section of reflector a is substantially equal to the radar cross-section of reflectors b and c of the device of FIG. 3.

Similarly, in its preferred mode, the radar cross-section of reflectors a and b is substantially equal to the radar cross-section of reflectors c and d of the device of FIG. 4.

With reference to the device of FIG. 1, for example, the instantaneous vertically-polarized return signal from the upper axially rotating dihedral reflector 12 (reflector A for the purposes of the equations below) in the quadrahedral is given by the equation $$\Gamma_A = \sigma \cos 2\theta_o \cos 2\pi f_o t$$

where $\theta_o$ = axial rotation rate of the reflector
$f_o$ = RF frequency of the radar The lower rotating dihedral reflector 14 (reflector B for the purposes of the equations below) has its seam displaced 45 degrees from that of reflector 12, and its return is delayed 90 degrees in phase from that of reflector 12. Therefore, the return from reflector 14 is given by $$\Gamma_B = \sigma \cos 2(\theta_o - \pi/4) \sin 2\pi f_o t \text{ or,}$$
$$\Gamma_B = \sigma \sin 2\theta_o \sin 2\pi f_o t$$

Let $f_D = \theta_o/\pi$, and using trigonometric identities
$$\Gamma_B = (\sigma/2)[\cos 2\pi (f_o + f_D)t - \cos 2\pi (f_o - f_D)t]$$
and
$$\Gamma_A = (\sigma/2)[\cos 2\pi (f_o + f_D)t + \cos 2\pi (f_o - f_D)t].$$

The total instantaneous vertically polarized return ($\Gamma$) from reflectors 12 and 14 is given by $$\Gamma = \Gamma_A + \Gamma_B = \sigma \cos 2\pi (f_o + f_D)t$$

Thus, the detected radar signal reflected from the quadrahedral will be of constant amplitude with an RCS of $\sigma$, and the reflected signal will be offset from the radar carrier frequency by the Doppler frequency ($f_D$). Since the RCS of the reflector can be calculated from known formulas, the return signal amplitudes can be precisely determined. Thus, the device produces an ideal single-sided Doppler component such as would be received from a constant RCS target moving at a constant speed in the direction of the radar.

It can be seen, therefore, that the device of this invention provides a constant calibrated amplitude return with a Doppler frequency shift that is directly related to the rotational speed of the reflectors. In a spectral analyzer display of the return from the rotating reflectors the spectral return appears as a sideband ($f_1$) on one side separated from the radar frequency ($f_0$) by the Doppler shift ($f_d$), while the sideband ($f_{-1}$) on the other side of $f_0$ is suppressed. If the amplitude of the unwanted sideband ($f_{-1}$) is not completely suppressed, it will cause an amplitude fluctuation on the target return, and depending upon where the radar samples the return, the apparent target size will either be increased or decreased.

Figure 5:
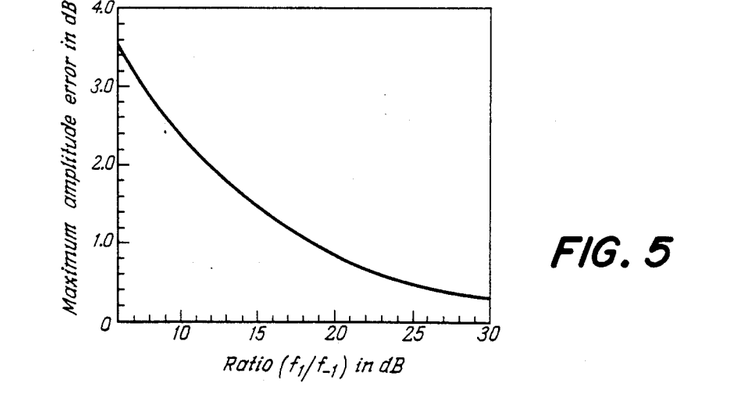
FIG. 5 shows the maximum amplitude error as a function of the sidelobe ratio of the embodiment of FIG. 1.

FIG. 5 shows the worst case effect of the amplitude fluctuation as a function of the ratio of $f_1$ to $f_{-1}$ for the embodiment of FIG. 1. A sideband suppression of 18.3 dB provides a maximum measurement error in the apparent target radar cross-section of $\pm 1$ dB due to amplitude modulation of the return. Since RCS calibration measurements include observations of a large number of returns, the effects of the amplitude modulations will tend to be averaged so that a variation of $\pm 1$ dB will have negligible effects on the results. If the apparent RCS varied as much as $\pm 3$ dB, the resulting RCS measurements could be biased.

An MTI target simulator was fabricated and calibrated against the RCS of a polished metal sphere of 25.1 inch diameter at the RF frequency of 1250 MHz. The radar cross-section (RCS) is defined as that radar return received from a perfectly conducting sphere of a physical, two dimensional area. Thus, a 44.5 inch diameter sphere projects a two dimensional area of one square meter in the direction of the radar, and thus by definition has a radar cross-section (RCS) of one square meter. The 25.1 inch diameter sphere has a two dimensional area of 0.33 square meters, and thus a radar cross-section of 5 DB below one square meter. This sphere was used as a calibration standard of RCS for the measurements. The return from the moving target simulator (quadrahedral) with the dihedrals not rotating was about 3 dB higher than that of the sphere. As the dihedrals started to rotate, the sidebands started to separate from that of the stationary reflection from the quadrahedral housing. At 10,050 rpm the measured Doppler shift was approximately 335 Hz, which corresponds to that of an aircraft traveling at a radial rate of approximately 78 knots. At 1,250 MHz, the return from the lower sideband ($f_{-1}$) was measured to be 27 dB down from that of the upper sideband ($f_1$), and the amplitude of $f_1$ was about ½ dB less than that of the sphere. The RCS of the quadrahedral was, therefore, about 0.25 m².

Figure 6:
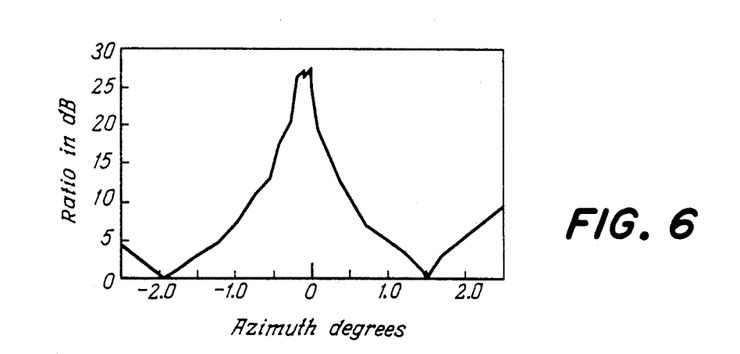
FIG. 6 shows the quadrahedral ratio of the larger to smaller sidebands as a function of azimuth angle at a frequency of 1250 MHz of the embodiment of FIG. 1.

As a quadrahedral is rotated laterally, the phase between the two reflectors changes from the ideal 90° separation in RF phase. Measurements at 1,250 MHz were made over the azimuth range from +2.5 degrees (clockwise looking down on the device) to −2.5 degrees. FIG. 6 shows that the ratio of the sidelobes $f_1$/$f_{-1}$ does decrease with azimuth angle for the embodiment of FIG. 1; however, there is at least a ±0.5° region over which the ratio does exceed 18.3 dB.

Figure 7:
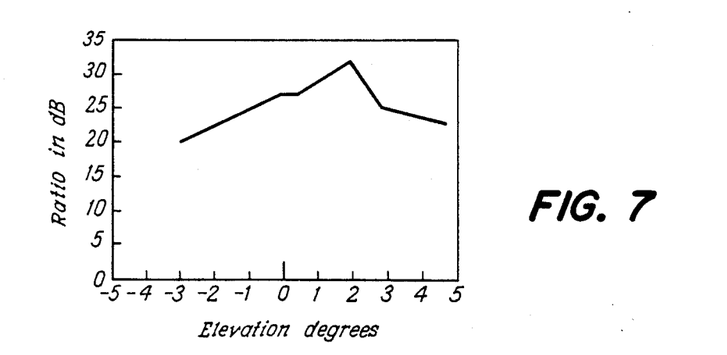
FIG. 7 shows the quadrahedral ratio of larger to smaller sidebands as a function of elevational angle at a frequency of 1250 MHz of the embodiment of FIG. 1.

Since elevation changes should not effect the relative phase between the reflectors, the sideband ratio does not change rapidly with elevation angle. FIG. 7 plots the sideband ratio based on measurements over a range from −3 to +4.8 degrees for the embodiment of FIG. 1. Over this range of elevation angles, the $f_1$ amplitude remained constant, while the $f_{-1}$ component was down by at least 20 dB. The fact that the ratio peaked at about +2° may indicate that the assumed 0° elevation case was not boresighted with the reflector.

As can be seen from the above, the crease 15 of the reflector 14 should ideally lag the crease 13 of reflector 12 by 45 degrees in rotation. A slight degredation of performance may occur if the lag of crease 15 is not 45 degrees resulting in minor amplitude fluctuations and unwanted increase in sidelobe. Similarly, if the longitudinal or axial offset between reflectors 12 and 14, for example, is not exactly λ/8 degradation of performance will also occur similar to off-axis rotation of the device also resulting in an increase of sidelobe.

While the invention has been particularly shown and described with reference to the preferred embodiment thereof, it will be understood by those skilled in the art that various changes in form and details may be made therein without departing from the spirit and scope of the invention.

Having thus described my invention, what I claim and desire to secure as Letters Patent is as follows;

1. A constant amplitude Doppler producing radar reflector for simulating a moving target to an illuminating radar comprising a plurality of axially mounted and rotatable reflectors having substantially equal radar cross-section wherein each reflector is positioned with respect to the others of said plurality of reflectors both laterally and in the direction toward said illuminating radar by a distance such that signals reflected therefrom are in phase quadrature.

2. The radar reflector of claim 1 wherein said plurality of reflectors are separated from each other in the direction towards the illuminating radar by a distance equivalent to one-eighth of the radar frequency wavelength of said illuminating radar.

3. The radar reflector of claim 1 wherein said plurality of reflectors comprises a pair of substantially identical dihedral reflectors that are mounted and rotated on separate axes.

4. The radar reflector of claim 1 wherein said plurality of radar reflectors comprises four dihedral reflectors that are mounted and rotated on a common axis.

5. The radar reflector of claim 1 wherein said plurality of radar reflectors comprises an array of three dihedral reflectors that are mounted and rotated about a common axis.

6. The radar reflector of claim 1 wherein said plurality of radar reflectors comprises a pair of dihedral reflectors mounted and rotated on a single axis.

7. The radar reflector of claim 1 wherein said plurality of axially mounted and rotatable reflectors further comprises at least two substantially identical even bounce dihedral reflectors each rotating on its axis at the same rate with the crease in each reflector set at 45 degrees with respect to the crease in the others of said even bounce reflectors.

8. A method for providing a constant amplitude Doppler producing radar reflector including at least two rotatable diherdral reflectors of equal radar cross section to simulate a moving target to an illuminating radar operating at a radio frequency characterized by a wavelength 1, said method comprising the steps of:
   mounting each of said plurality of dihedral reflectors on a rotatable shaft;
   positioning each dihedral reflector with respect to the others of said plurality of dihedral reflectors at a location along its shaft such that signals reflected therefrom are in phase quadrature when they are rotated; and
   rotating said dihedral reflectors at equal rotational speed.

9. The method of claim 8 wherein the step of rotating the dihedral reflectors includes selecting a simulated radial velocity for said constant amplitude Doppler producing radar reflector and rotating said shaft-mounted dihedral reflectors at a rate given by the formula:

$$RPM = \frac{V_r}{0.06\lambda}$$

where
   RPM = the rotational speed of the dihedral reflectors in revolutions per minute,
   $V_r$ = the simulated target radial velocity in km/hr,
   $\lambda$ = the illuminating radar's RF wavelength in meters.

10. The method of claim 8 wherein the step of mounting each of said plurality of dihedral reflectors on a rotatable shaft includes setting up said plurality of dihedral reflectors so that the crease of each of said plurality of dihedral reflectors becomes vertical at 45 degrees of rotation prior to when the crease of any other of said plurality of dihedral reflectors becomes vertical.

11. The method of claim 8 wherein the step of positioning each dihedral reflector with respect to the others of said plurality of dihedral reflectors includes separating each reflector in the direction towards the illuminating radar by a distance equivalent to one-eighth of the radio frequency wavelength of said illuminating radar.

12. A constant amplitude Doppler producing radar reflector for simulating a moving target to an illuminating radar comprising a plurality of axially mounted and rotatable reflectors each having an axis of rotation aligned in a direction toward said illuminating radar and each having a crease, said plurality of rotatable reflectors including a first reflector and a second reflector, the second reflector being displaced axially in the direction toward said illuminating radar from the first reflector and the crease of the second reflector displaced in rotation with respect to the crease of the first reflector such that the return signal from said constant amplitude radar reflector to said illuminating radar will be of substantially constant amplitude with an apparent radar cross-section which varies by less than ±3 dB.

13. A constant amplitude Doppler producing radar reflector as claimed in claim 12, wherein said second reflector is positioned with respect to said first reflector by a distance such that signals reflected therefrom are in phase quadrature.

14. A constant amplitude Doppler producing radar reflector as claimed in claim 12, wherein said second reflector is displaced from said first reflector in the direction towards the illuminating radar by a distance equivalent to one-eight of the radar frequency wavelength of said illuminating radar.

15. A constant amplitude Doppler producing radar reflector as claimed in claim 12, wherein said second reflector is displaced from said first reflector in rotation by 45 degrees.

16. A constant amplitude Doppler producing radar reflector as claimed in claim 12, wherein said first reflector includes a plurality of reflectors having a combined radar cross-section substantially equal to the radar cross-section of said second reflector.

17. A constant amplitude Doppler producing radar reflector as claimed in claim 12, wherein said second reflector includes a plurality of reflectors having a combined radar cross-section substantially equal to the radar cross-section of said first reflector.

18. A constant amplitude Doppler producing radar reflector as claimed in claim 12, wherein said first reflector includes a plurality of reflectors and said second reflector includes a plurality of reflectors, the radar cross-section of the first reflector being substantially equal to the radar cross section of the second reflector.

* * * * *

UNITED STATES PATENT AND TRADEMARK OFFICE
CERTIFICATE OF CORRECTION

PATENT NO. : 4,972,192

DATED : November 20, 1990

INVENTOR(S) : Joseph A. Bruder

It is certified that error appears in the above-identified patent and that said Letters Patent is hereby corrected as shown below:

Column 1, line 3 insert the following:

--The invention was made with Government support under Contract No. Tc-87-024 awarded by U.S. Customs Service. The Government has ccertain rights in the invention.--.

Signed and Sealed this

Ninth Day of June, 1992

Attest:

DOUGLAS B. COMER

*Attesting Officer*   *Acting Commissioner of Patents and Trademarks*